United States Patent
Zhao et al.

(10) Patent No.: US 12,004,124 B2
(45) Date of Patent: Jun. 4, 2024

(54) RESOURCE ALLOCATION MODE DETERMINING METHOD, TERMINAL AND NETWORK DEVICE

(71) Applicant: DATANG MOBILE COMMUNICATIONS EQUIPMENT CO., LTD., Beijing (CN)

(72) Inventors: Yali Zhao, Beijing (CN); Li Chen, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 416 days.

(21) Appl. No.: 17/419,457

(22) PCT Filed: Aug. 27, 2019

(86) PCT No.: PCT/CN2019/102758
§ 371 (c)(1),
(2) Date: Jun. 29, 2021

(87) PCT Pub. No.: WO2020/134135
PCT Pub. Date: Jul. 2, 2020

(65) Prior Publication Data
US 2022/0078756 A1    Mar. 10, 2022

(30) Foreign Application Priority Data

Dec. 29, 2018 (CN) .......................... 201811635567.0

(51) Int. Cl.
*H04W 72/02* (2009.01)
*H04W 72/0446* (2023.01)
(Continued)

(52) U.S. Cl.
CPC ....... *H04W 72/02* (2013.01); *H04W 72/0446* (2013.01); *H04W 72/0453* (2013.01); *H04W 72/542* (2023.01); *H04W 72/56* (2023.01)

(58) Field of Classification Search
CPC ............ H04W 72/02; H04W 72/0446; H04W 72/0453; H04W 72/20; H04W 72/542; H04W 72/56
(Continued)

(56) References Cited

U.S. PATENT DOCUMENTS 11,510,179 B2 * 11/2022 Chae ................. H04W 72/0453
2011/0128893 A1    6/2011 Park et al.
(Continued)

FOREIGN PATENT DOCUMENTS

CN        102113398 A     6/2011
CN        107040959 A     8/2017
(Continued)

OTHER PUBLICATIONS

Chinese Office Action dated Sep. 23, 2022 for Application No. 201811635567.0.
(Continued)

*Primary Examiner* — Robert J Lopata
(74) *Attorney, Agent, or Firm* — Harness, Dickey & Pierce, P.L.C.

(57) ABSTRACT

The embodiments of the present disclosure provide a resource allocation mode determining method, a terminal and a network device. The method includes: obtaining resource allocation mode configuration information of a sidelink interface of a terminal; in the case that the resource allocation mode configuration information includes at least two resource allocation modes, determining one resource allocation mode allowed by the terminal on a preset frequency band at a preset time from the at least two resource allocation modes.

20 Claims, 4 Drawing Sheets

(51) Int. Cl.
*H04W 72/0453* (2023.01)
*H04W 72/542* (2023.01)
*H04W 72/56* (2023.01)

(58) Field of Classification Search
USPC .......................................................... 370/329
See application file for complete search history.

(56) References Cited

U.S. PATENT DOCUMENTS

| | | | | |
|---|---|---|---|---|
| 2019/0053251 | A1* | 2/2019 | Loehr | H04W 72/1263 |
| 2019/0174530 | A1* | 6/2019 | Kim | H04W 72/12 |
| 2019/0306911 | A1* | 10/2019 | Hahn | H04W 72/20 |
| 2019/0357304 | A1* | 11/2019 | Zeng | H04L 5/0051 |
| 2021/0068125 | A1* | 3/2021 | Lin | H04W 76/27 |
| 2021/0136744 | A1* | 5/2021 | Lu | H04W 72/20 |
| 2021/0297841 | A1* | 9/2021 | Jung | H04W 72/23 |

FOREIGN PATENT DOCUMENTS

| | | |
|---|---|---|
| EP | 3051736 A1 | 8/2016 |
| WO | WO-2018/016157 A1 | 1/2018 |
| WO | WO-2018/027528 A1 | 2/2018 |

OTHER PUBLICATIONS

Extended European Search Report dated Jan. 25, 2022 for Application No. EP 19 90 3464.6.
Catt, "QoS Management for V2X", Agenda item 7.2.4.4, 3GPP TSSG RAN WG1 Meeting #95, R1-1812623, Nov. 12-16, 2018, Spokane, USA.
Fujitsu, "Discussion on Sidelink Bi-mode Transmission in NR-V2X", Agenda Item 7.2.4.3.3, 3GPP TSG-RAN Wg1 Meeting #94Bis, R1-1810595, Oct. 8-12, 2018, Chengdu, China.
International Search Report and Written Opinion for International Application No. PCT/CN2019/102758 dated Nov. 29, 2019.

* cited by examiner

RESOURCE ALLOCATION MODE DETERMINING METHOD, TERMINAL AND NETWORK DEVICE

CROSS-REFERENCE TO RELATED APPLICATIONS

This application is the U.S. national phase of PCT Application No PCT/CN2019/102758 filed on Aug. 27, 2019, which claims a priority of the Chinese patent application No. 201811635567.0 filed on Dec. 29, 2018, which is incorporated herein by reference in its entirety.

TECHNICAL FIELD

The present disclosure relates to the field of communication technology, in particular to a resource allocation mode determining method, a terminal and a network device.

BACKGROUND

In the Long Term Evolution (LTE) system, a resource allocation mode allowed by a terminal in a connected state on the sidelink interface is determined by the network, and the network will only configure the terminal to use a unique resource allocation mode on the sidelink interface.

For the New Radio (NR) system, the service of the sidelink interface will be more abundant than the LTE system. Therefore, the terminal may be configured with a resource allocation mode scheduled by the network and a resource allocation mode selected by the terminal at the same time on the sidelink interface. However, for a frequency band, the terminal cannot support simultaneous transmission of two transmission blocks at the same time. Therefore, when a plurality of resource allocation modes are configured for the terminal at the same time, the problem of how to determine the resource allocation mode allowed by the terminal at a specific time on a specific frequency band needs to be solved.

SUMMARY

The present disclosure provides a resource allocation mode determining method, a terminal and a network device, so as to solve the problem of how to determine the resource allocation mode allowed by the terminal at a specific time on a specific frequency band when the terminal is configured with a plurality of resource allocation modes.

An embodiment of the present disclosure provides a resource allocation mode determining method applied to a terminal, including: obtaining resource allocation mode configuration information of a sidelink interface of a terminal; in a case that the resource allocation mode configuration information includes at least two resource allocation modes, determining a resource allocation mode allowed by the terminal on a preset frequency band at a preset time from the at least two resource allocation modes.

In some embodiments, the resource allocation mode configuration information includes at least one of the following: a resource allocation mode allowed by the terminal on the sidelink interface; a resource allocation mode allowed by the terminal in each frequency band or a set of frequency band of the sidelink interface; a resource allocation mode allowed by the terminal for each wireless access technology allowed by the sidelink interface; a resource allocation mode allowed by the terminal for each set of quality of service (QoS) parameters on the sidelink interface; a resource allocation mode allowed by the terminal for each logical channel on the sidelink interface; for each frequency band or the set of frequency band, a resource allocation mode allowed by each logical channel of the sidelink interface of the terminal in the frequency band or the set of frequency band; for each wireless access technology, a resource allocation mode allowed by each logical channel of the sidelink interface of the terminal when using the wireless access technology.

In some embodiments, the determining a resource allocation mode allowed by the terminal on a preset frequency band at a preset time from the at least two resource allocation modes includes: determining a resource allocation mode allowed by the terminal on the preset frequency band at the preset time according to priorities of the at least two resource allocation modes agreed in a protocol.

In some embodiments, the at least two resource allocation modes include: a resource allocation mode scheduled by the network and a resource allocation mode selected by the terminal; the protocol defines a priority of the resource allocation mode scheduled by the network is higher than a priority of the resource allocation mode selected by the terminal; or the protocol defines that the priority of the resource allocation mode selected by the terminal is higher than the priority of the resource allocation mode scheduled by the network.

In some embodiments, the determining a resource allocation mode allowed by the terminal on a preset frequency band at a preset time from the at least two resource allocation modes includes: determining a resource allocation mode allowed by the terminal on the preset frequency band at the preset time according to priorities of the at least two resource allocation modes configured by a network device.

In some embodiments, the priorities of the at least two resource allocation modes are configured by the network device based on the terminal, or separately configured based on each frequency band or the set of frequency band of the sidelink interface, separately configured based on each logic channel of the sidelink interface, or separately configured based on each set of QoS parameters of the sidelink interface.

In some embodiments, the determining a resource allocation mode allowed by the terminal on a preset frequency band at a preset time from the at least two resource allocation modes includes: determining a resource allocation mode allowed on the preset frequency band at the preset time from the at least two resource allocation modes according to the priorities of the at least two resource allocation modes determined by the terminal.

In some embodiments, the determining a resource allocation mode allowed on the preset frequency band at the preset time from the at least two resource allocation modes according to the priorities of the at least two resource allocation modes determined by the terminal further includes: determining the priorities of the at least two resource allocation modes according to a priority of a resource allocation mode configured for a target logical channel, wherein the target logical channel is a logical channel with a highest priority or having a highest latency requirement in a preset logical channel set, and the preset logical channel set refers to a set of logic channels which are used to be transmitted on the preset frequency band at the present time and have available data on a current buffer.

In some embodiments, before obtaining the resource allocation mode configuration information of the sidelink interface of the terminal, the method further includes: reporting preset information of the sidelink; the preset information includes at least one of the following: a frequency band or a set of frequency band allowed by the sidelink interface of the terminal; a wireless access technology allowed by the terminal on the sidelink interface; a frequency band or a set of frequency band and a radio access technology corresponding to the frequency band or the set of frequency band allowed by the terminal on the sidelink interface; a logical channel identifier corresponding to each logical channel of the sidelink interface of the terminal; all QoS parameters or QoS parameters corresponding to a current logical channel or QoS parameters corresponding to a logical channel that currently has data to be sent allowed by the sidelink interface of the terminal; QoS parameters corresponding to each logical channel of the sidelink interface of the terminal.

The present disclosure provides a resource allocation mode determining method applied to a network device, including: determining resource allocation mode configuration information of a sidelink interface of a terminal, wherein the resource allocation mode configuration information includes at least two resource allocation modes; sending the resource allocation mode configuration information to the terminal.

In some embodiments, the determining resource allocation mode configuration information of a sidelink interface of a terminal includes: obtaining preset information of a sidelink reported by the terminal; determining the resource allocation mode configuration information of the sidelink interface of the terminal according to the preset information of the sidelink; wherein the preset information includes at least one of the following: a frequency band or a set of frequency band allowed by the sidelink interface of the terminal; a wireless access technology allowed by the terminal on the sidelink interface; a frequency band or a set of frequency band and a radio access technology corresponding to the frequency band or the set of frequency band allowed by the terminal on the sidelink interface; a logical channel identifier corresponding to each logical channel of the sidelink interface of the terminal; all QoS parameters or QoS parameters corresponding to a current logical channel or QoS parameters corresponding to a logical channel that currently has data to be sent allowed by the sidelink interface of the terminal; QoS parameters corresponding to each logical channel of the sidelink interface of the terminal.

In some embodiments, the determining the resource allocation mode configuration information of the sidelink interface of the terminal according to the preset information of the sidelink includes: determining a resource allocation mode allowed by the terminal on the sidelink interface according to the preset information of the sidelink; determining the resource allocation mode configuration information of the terminal according to the resource allocation mode allowed by the terminal on the sidelink interface.

In some embodiments, the determining the resource allocation mode allowed by the terminal on the sidelink interface according to the preset information of the sidelink includes at least one of the following methods: determining a resource allocation allowed by the terminal on the sidelink interface based on the terminal; determining a resource allocation mode allowed by the terminal based on each frequency band or a set of frequency band of the sidelink interface of the terminal; determining a resource allocation mode allowed by the terminal based on each wireless access technology allowed by the terminal on the sidelink interface; determining a resource allocation mode allowed by the terminal based on each set of QoS parameters of the sidelink interface; separately determining a resource allocation mode allowed by each logical channel of the terminal on the sidelink interface based on each logical channel of the sidelink interface of the terminal; for each frequency band or the set of frequency band, determining the resource allocation mode allowed by the terminal based on each logical channel of the sidelink interface of the terminal; for each wireless access technology, determining the resource allocation mode allowed by the terminal based on each logical channel of the sidelink interface of the terminal.

In some embodiments, after separately determining the resource allocation mode allowed by each logical channel of the terminal on the sidelink interface based on each logical channel of the sidelink interface of the terminal, the method further includes: configuring a resource allocation mode corresponding to the frequency band or the set of frequency band or the radio access technology for each logical channel.

In some embodiments, the method further includes: configuring a priority of the resource allocation mode and sending the priority to the terminal.

In some embodiments, the configuring a priority of the resource allocation mode comprises: configuring the priority of the resource allocation mode based on the terminal; or separately configuring the priority of the resource allocation mode based on each frequency band or the set of frequency band of the sidelink interface; or separately configuring the priority of the resource allocation mode based on each logical channel of the sidelink interface; or separately configuring the priority of the resource allocation mode based on each set of QoS parameters of the sidelink interface.

In some embodiments, after separately configuring the priority of the resource allocation mode based on each logical channel of the sidelink interface, the method further includes: configuring a priority of a resource allocation mode allowed by each frequency band or the set of frequency band of each logical channel or the wireless access technology.

The disclosure provides a terminal, including: a transceiver, a memory, a processor, and a program stored in the memory and executed by the processor, wherein the processor executes the program to implements the following steps: obtaining resource allocation mode configuration information of a sidelink interface of a terminal; in a case that the resource allocation mode configuration information includes at least two resource allocation modes, determining a resource allocation mode allowed by the terminal on a preset frequency band at a preset time from the at least two resource allocation modes.

In some embodiments, the resource allocation mode configuration information includes at least one of the following: a resource allocation mode allowed by the terminal on the sidelink interface; a resource allocation mode allowed by the terminal in each frequency band or a set of frequency band of the sidelink interface; a resource allocation mode allowed by the terminal for each wireless access technology allowed by the sidelink interface; a resource allocation mode allowed by the terminal for each set of quality of service (QoS) parameters on the sidelink interface; a resource allocation mode allowed by the terminal for each logical channel on the sidelink interface; for each frequency band or the set of frequency band, a resource allocation mode allowed by each logical channel of the sidelink interface of the terminal in the frequency band or the set of frequency band; for each wireless access technology, a resource allocation mode allowed by each logical channel of the sidelink interface of the terminal when using the wireless access technology.

In some embodiments, the processor further executes the program to implement the following step: determining a resource allocation mode allowed by the terminal on the preset frequency band at the preset time according to priorities of the at least two resource allocation modes agreed in a protocol.

In some embodiments, the at least two resource allocation modes include: a resource allocation mode scheduled by the network and a resource allocation mode selected by the terminal; the protocol defines a priority of the resource allocation mode scheduled by the network is higher than a priority of the resource allocation mode selected by the terminal; or the protocol defines that the priority of the resource allocation mode selected by the terminal is higher than the priority of the resource allocation mode scheduled by the network.

In some embodiments, the processor further executes the program to implement the following step: determining a resource allocation mode allowed by the terminal on the preset frequency band at the preset time according to priorities of the at least two resource allocation modes configured by a network device.

In some embodiments, the priorities of the at least two resource allocation modes are configured by the network device based on the terminal, or separately configured based on each frequency band or the set of frequency band of the sidelink interface, separately configured based on each logic channel of the sidelink interface, or separately configured based on each set of QoS parameters of the sidelink interface.

In some embodiments, the processor further executes the program to implement the following step: determining a resource allocation mode allowed on the preset frequency band at the preset time from the at least two resource allocation modes according to the priorities of the at least two resource allocation modes determined by the terminal.

In some embodiments, the processor further executes the program to implement the following step: determining the priorities of the at least two resource allocation modes according to a priority of a resource allocation mode configured for a target logical channel, wherein the target logical channel is a logical channel with a highest priority or having a highest latency requirement in a preset logical channel set, and the preset logical channel set refers to a set of logic channels which are used to be transmitted on the preset frequency band at the present time and have available data on a current buffer.

In some embodiments, the processor further executes the program to implement the following step: reporting preset information of the sidelink; the preset information includes at least one of the following: a frequency band or a set of frequency band allowed by the sidelink interface of the terminal; a wireless access technology allowed by the terminal on the sidelink interface; a frequency band or a set of frequency band and a radio access technology corresponding to the frequency band or the set of frequency band allowed by the terminal on the sidelink interface; a logical channel identifier corresponding to each logical channel of the sidelink interface of the terminal; all QoS parameters or QoS parameters corresponding to a current logical channel or QoS parameters corresponding to a logical channel that currently has data to be sent allowed by the sidelink interface of the terminal; QoS parameters corresponding to each logical channel of the sidelink interface of the terminal.

The present disclosure provides a computer-readable storage medium having a computer program stored thereon, wherein the computer program is executed by a processor to implement the steps of the resource allocation mode determining method.

The present disclosure provides a network device, including: a transceiver, a memory, a processor, and a program stored on the memory and executed by the processor, wherein the processor executes the program to implement the following steps: determining resource allocation mode configuration information of a sidelink interface of a terminal, wherein the resource allocation mode configuration information includes at least two resource allocation modes; sending the resource allocation mode configuration information to the terminal through the transceiver.

In some embodiments, the processor further executes the program to implement the following steps: obtaining preset information of a sidelink reported by the terminal; determining the resource allocation mode configuration information of the sidelink interface of the terminal according to the preset information of the sidelink; wherein the preset information includes at least one of the following: a frequency band or a set of frequency band allowed by the sidelink interface of the terminal; a wireless access technology allowed by the terminal on the sidelink interface; a frequency band or a set of frequency band and a radio access technology corresponding to the frequency band or the set of frequency band allowed by the terminal on the sidelink interface; a logical channel identifier corresponding to each logical channel of the sidelink interface of the terminal; all QoS parameters or QoS parameters corresponding to a current logical channel or QoS parameters corresponding to a logical channel that currently has data to be sent allowed by the sidelink interface of the terminal; QoS parameters corresponding to each logical channel of the sidelink interface of the terminal.

In some embodiments, the processor further executes the program to implement the following steps: determining a resource allocation mode allowed by the terminal on the sidelink interface according to the preset information of the sidelink; determining the resource allocation mode configuration information of the terminal according to the resource allocation mode allowed by the terminal on the sidelink interface.

In some embodiments, the processor further executes the program to implement at least one of the following methods: determining a resource allocation allowed by the terminal on the sidelink interface based on the terminal; determining a resource allocation mode allowed by the terminal based on each frequency band or a set of frequency band of the sidelink interface of the terminal; determining a resource allocation mode allowed by the terminal based on each wireless access technology allowed by the terminal on the sidelink interface; determining a resource allocation mode allowed by the terminal based on each set of QoS parameters of the sidelink interface; separately determining a resource allocation mode allowed by each logical channel of the terminal on the sidelink interface based on each logical channel of the sidelink interface of the terminal; for each frequency band or the set of frequency band, determining the resource allocation mode allowed by the terminal based on each logical channel of the sidelink interface of the terminal; for each wireless access technology, determining the resource allocation mode allowed by the terminal based on each logical channel of the sidelink interface of the terminal.

In some embodiments, the processor further executes the program to implement the following step: configuring a resource allocation mode corresponding to the frequency band or the set of frequency band or the radio access technology for each logical channel.

In some embodiments, the processor further executes the program to implement the following step: configuring a priority of the resource allocation mode and sending the priority to the terminal.

In some embodiments, the processor further executes the program to implement the following steps: configuring the priority of the resource allocation mode based on the terminal; or separately configuring the priority of the resource allocation mode based on each frequency band or the set of frequency band of the sidelink interface; or separately configuring the priority of the resource allocation mode based on each logical channel of the sidelink interface; or separately configuring the priority of the resource allocation mode based on each set of QoS parameters of the sidelink interface.

In some embodiments, the processor further executes the program to implement the following step: configuring a priority of a resource allocation mode allowed by each frequency band or the set of frequency bandd of each logical channel or the wireless access technology.

The present disclosure provides a computer-readable storage medium having a computer program stored thereon, wherein the computer program is executed by a processor to implement the steps of the resource allocation mode determining method.

The present disclosure provides a terminal, including: an obtaining module, configured to obtain resource allocation mode configuration information of a sidelink interface of a terminal; a first determining module, configured to, in a case that the resource allocation mode configuration information includes at least two resource allocation modes, determine a resource allocation mode allowed by the terminal on a preset frequency band at a preset time from the at least two resource allocation modes.

In some embodiments, the first determining module is configured to determine a resource allocation mode allowed by the terminal on the preset frequency band at the preset time according to priorities of the at least two resource allocation modes.

The present disclosure provides a network device, including: a second determining module, configured to determine resource allocation mode configuration information of a sidelink interface of a terminal, wherein the resource allocation mode configuration information includes at least two resource allocation modes; a sending module, configured to send the resource allocation mode configuration information to the terminal.

In some embodiments, the second determining module includes: a first obtaining sub-module, configured to obtain preset information of a sidelink reported by the terminal; a first determining sub-module, configured to determine the resource allocation mode configuration information of the sidelink interface of the terminal according to the preset information of the sidelink; wherein the preset information includes at least one of the following: a frequency band or a set of frequency band allowed by the sidelink interface of the terminal; a wireless access technology allowed by the terminal on the sidelink interface; a frequency band or a set of frequency band and a radio access technology corresponding to the frequency band or the set of frequency band allowed by the terminal on the sidelink interface; a logical channel identifier corresponding to each logical channel of the sidelink interface of the terminal; all QoS parameters or QoS parameters corresponding to a current logical channel or QoS parameters corresponding to a logical channel that currently has data to be sent allowed by the sidelink interface of the terminal; QoS parameters corresponding to each logical channel of the sidelink interface of the terminal.

The beneficial effects of the present disclosure are as follows.

According to the resource allocation module determining method in some embodiments of the present disclosure, the resource allocation mode configuration information of the sidelink interface of the terminal is obtained; in the case that the resource allocation mode configuration information includes at least two resource allocation modes, a resource allocation mode allowed by the terminal on the preset frequency band at a preset time is determined from the at least two resource allocation modes, so that the terminal can select a resource allocation mode allowed in a specific frequency band from the plurality of resource allocation modes of the sidelink interface.

DETAILED DESCRIPTION

In order to make the technical problems, technical solutions, and advantages to be solved by the present disclosure clearer, the following will describe in detail with reference to specific embodiments and drawings.

In order to enable those skilled in the art to better understand the resource allocation mode determining method in some embodiments of the present disclosure, the following description is given.

(1) Description of Sidelink Communication in LTE System

Figure 1:
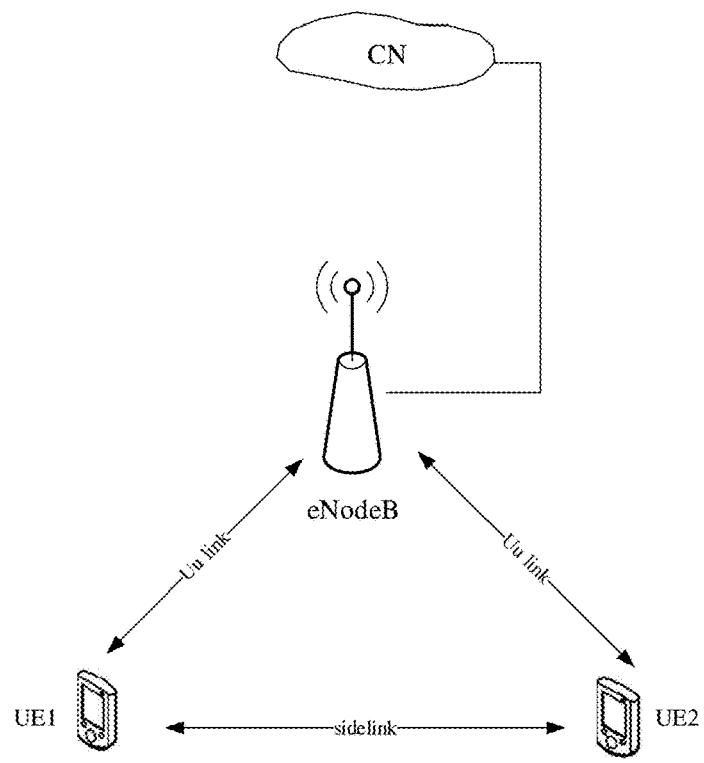
FIG. 1 is a schematic diagram of sidelink communication between devices.

As shown in FIG. 1, devices that are close to each other allow sidelink communication between devices. For ease of description, the sidelink communication link between the device and the device is defined as the Sidelink, and a corresponding wireless interface is called a sidelink interface; the cellular communication link between the network and the sidelink communication device is called a Uu link, and the corresponding interface is called a Uu interface.

The sidelink communication devices can also be all on the network, or all off the network, or part of the devices can be on the network and part of the devices can be off the network. The so-called on the network means that the device participating in sidelink communication is located within the coverage of the 3GPP sidelink communication carrier, and the so-called off the network means that the device participating in the sidelink communication is not within the coverage of the 3GPP sidelink communication carrier.

Typical sidelink communication scenarios include the following three types: one-to-one communication (unicast) between sidelink communication terminals; one device can send the same data to all devices in a communication group at a time (multicast); and one device can send the same data (broadcast) to all nearby devices at once.

In addition, the sidelink interface in the LTE system supports two resource allocation modes: a resource allocation mode scheduled by the network, in which the network allocates resources to the terminal according to the Sidelink Buffer Status Reporting (BSR) reported by the terminal (also called Mode 3); a resource allocation mode selected by the terminal, in which the terminal selects the resource allowed by the sidelink communication link for transmission from pre-configured transmission resources or transmission resources configured by the network through broadcast or dedicated signaling (also called Mode 4).

For the sidelink interface, if the terminal is on the network, no matter the resource allocation mode scheduled by the network or the resource allocation mode selected by the terminal is allowed, the resources allowed by the sidelink interface are controlled by the network, and one terminal is only allowed one resource allocation mode on the sidelink interface. The network controls the resource pool allocated by the sidelink interface (the resource allocation mode selected by the terminal) or specific resources (the resource allocation mode scheduled by network) through the Uu interface. Therefore, they are collectively referred to as Uu-based resource allocation.

(2) SL Resource Allocation Mode in the NR System

Similar to LTE, the sidelink interface in the NR system also supports two resource allocation modes: a resource allocation mode scheduled by the network, in which the network allocates resources for the terminal according to the Sidelink Buffer Status Reporting (BSR) reported by the terminal (also called Mode 1); a resource allocation mode selected by the terminal, in which the terminal selects the resource allowed by the sidelink communication link for transmission from pre-configured transmission resources or transmission resources configured by the network through broadcast or dedicated signaling (also called Mode 2).

For the New Radio (NR) system, the service of the sidelink interface will be more abundant than the LTE. Therefore, the sidelink interface may be configured with the resource allocation mode scheduled by the network and the resource allocation mode selected by the terminal at the same time. However, for the same frequency band, the terminal cannot support the transmission of two transport blocks at the same time. Therefore, it is necessary to clarify how to determine the resource allocation mode to be allowed by the terminal on one frequency band when the terminal is configured with both the resource allocation scheduled by the network and the resource allocation selected by the terminal at the same time.

Figure 2:
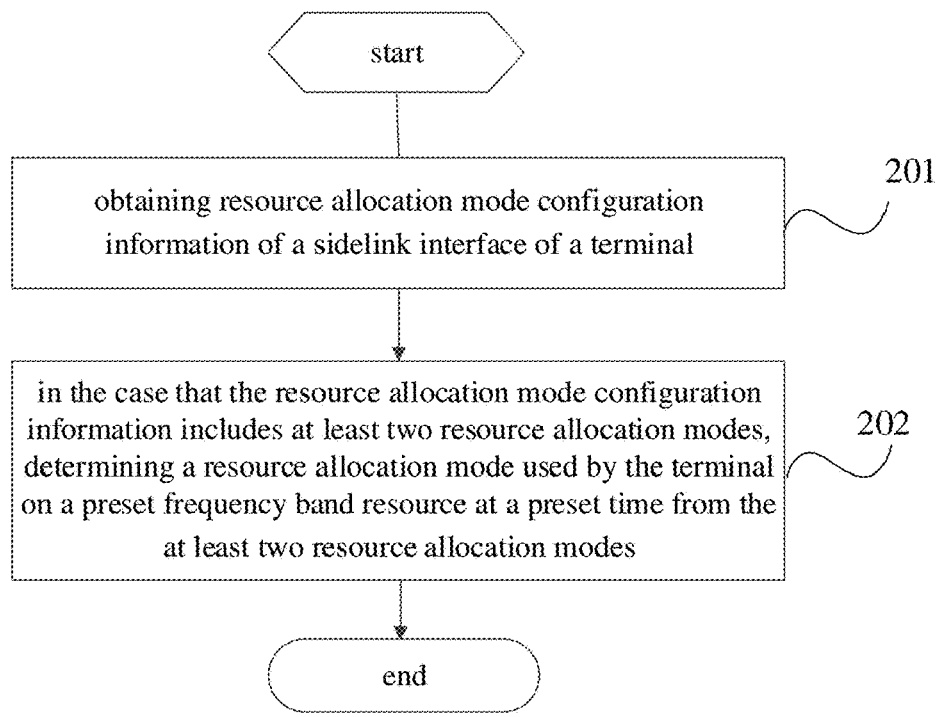
FIG. 2 is a schematic flowcharts of a resource allocation mode determining method in some embodiments of the present disclosure.

Based on this, as shown in FIG. 2, some embodiments of the present disclosure provide a resource allocation mode determining method, which is applied to a terminal, including the following steps.

Step 201: obtaining resource allocation mode configuration information of a sidelink interface of a terminal.

Wherein, the resource allocation mode configuration information includes at least one of the following: a resource allocation mode allowed by the terminal on the sidelink interface; a resource allocation mode allowed by the terminal in each frequency band or a set of frequency band of the sidelink interface; a resource allocation mode allowed by the terminal for each wireless access technology allowed by the sidelink interface; a resource allocation mode allowed by the terminal for each set of quality of service (QoS) parameters on the sidelink interface; a resource allocation mode allowed for the terminal for each logical channel on the sidelink interface; for each frequency band or set of frequency band, a resource allocation mode allowed by each logical channel of the sidelink interface of the terminal in the frequency band or set of frequency band; for each wireless access technology, a resource allocation mode allowed by each logical channel of the sidelink interface of the terminal when using the wireless access technology.

In addition, the resource allocation mode allowed by the terminal is configured according to a protocol version allowed by the terminal on the sidelink interface.

Step 202: in the case that the resource allocation mode configuration information includes at least two resource allocation modes, determining a resource allocation mode allowed by the terminal on a preset frequency band at a preset time from the at least two resource allocation modes.

Specifically, in the case where the resource allocation mode configuration information includes at least two resource allocation modes, the terminal selects a resource allocation mode with the highest priority from the at least two resource allocation modes as the resource allocation model allowed by the terminal on a preset frequency band at a preset time.

In some embodiments of the present disclosure, priorities of the at least two resource allocation modes may be agreed by the protocol, may be configured by the network device, or may be determined by the terminal.

The preset time in some embodiments of the present disclosure refers to any time when the terminal can use at least two resource allocation modes at the same time, for example, when the terminal can use the resource allocation mode scheduled by the network and the resource allocation mode selected by the terminal at the same time.

According to the resource allocation module determining method in some embodiments of the present disclosure, the resource allocation mode configuration information of the sidelink interface of the terminal is obtained; in the case that the resource allocation mode configuration information includes at least two resource allocation modes, a resource allocation mode allowed by the terminal on the preset frequency band at a preset time is determined from the at least two resource allocation modes, so that the terminal can select a resource allocation mode allowed in a specific frequency band from the plurality of resource allocation modes of the sidelink interface.

As a first optional implementation, the step 202 includes: determining a resource allocation mode allowed by the terminal on the preset frequency band at the preset time according to the priorities of the at least two resource allocation modes agreed in the protocol.

The at least two resource allocation modes in some embodiments of the present disclosure include the resource allocation mode scheduled by the network and the resource allocation mode selected by the terminal. In the protocol, the priority of the resource allocation mode scheduled by the network is higher than the priority of the resource allocation mode selected by the terminal; or, the priority of the resource allocation mode selected by the terminal is higher than the priority of the resource allocation mode scheduled by the network.

For example, if it is agreed in the protocol that the resource allocation mode scheduled by the network always has a higher priority than the resource allocation mode selected by the terminal, the terminal selects the resource allocation mode scheduled by the network for use on the preset frequency band at the preset time.

For example, if it is agreed in the protocol that the resource allocation mode selected by the terminal always has a higher priority than the resource allocation mode scheduled by the network, and the terminal selects the resource allocation mode selected by the terminal for use on the preset frequency band at the preset time.

As a second optional implementation, the step 202 includes: determining a resource allocation mode allowed by the terminal on the preset frequency band at the preset time according to the priorities of the at least two resource allocation modes configured by the network device.

Specifically, the priorities of the at least two resource allocation modes are configured by the network device based on the terminal, or separately configured based on each frequency band or set of frequency band of the sidelink interface, separately configured based on each logic channel of the sidelink interface, or separately configured based on each set of QoS parameters of the sidelink interface.

In some embodiments of the present disclosure, the network device may configure the priorities of at least two resource allocation modes based on the terminal, or separately configure priorities of the at least two resource allocation modes based on each frequency band (such as BWP or carrier) or set of frequency band of the sidelink interface; or separately configure priorities of the at least two resource allocation modes based on each logical channel of the sidelink interface. Further, priorities of a plurality of resource allocation modes allowed by each logical channel are separately configured based on each frequency band or set of frequency band or a radio access technology set, or the priorities of the at least two resource allocation modes are configured based on each set of QoS parameters of the sidelink interface.

According to the priorities of at least two resource allocation modes configured by the network device, the terminal selects the resource allocation mode with the highest priority to use on the preset frequency band at the preset time.

As a third optional implementation, the step 202 includes: determining resource allocation mode allowed on the preset frequency band at the preset time from the at least two resource allocation modes according to the priorities of the at least two resource allocation modes determined by the terminal.

Specifically, according to the priorities of at least two resource allocation modes determined by the terminal, the resource allocation module with the highest priority is selected from the at least two resource allocation modes as the resource allocation mode allowed by the terminal on the preset frequency band at the preset time.

Further, according to the priorities of the at least two resource allocation modes determined by the terminal, before determining a resource allocation mode allowed by the terminal adopts on the preset frequency band at the preset time from the at least two resource allocation modes, further includes: determining the priorities of the at least two resource allocation modes according to a priority of a resource allocation mode configured for a target logical channel, wherein the target logical channel is a logical channel with the highest priority or having the highest latency requirement in the preset logical channel set, and the preset logical channel set refers to a set of logic channels which is used to be transmitted on the preset frequency band at the present time and has available data on the current buffer.

For example, for any time T, the terminal first determines priorities among the logical channels with available data in the current buffer and is used to be transmitted on the frequency band, and selects the logical channel with the highest priority. The resource allocation mode to be allowed on the sidelink interface at time T on the specific frequency band is determined according to the logical channel with the highest priority.

For another example, for any time T, the terminal first determines the logical channels with available data in the current buffer and is used to be transmitted on the frequency band, and selects the logical channel with the highest delay requirement. The resource allocation mode to be allowed on the sidelink interface at time T on the specific frequency band is determined according to the logical channel with the highest delay requirement.

Further, before obtaining the resource allocation mode configuration information of the sidelink interface of the terminal, the method further includes: reporting preset information of the sidelink.

The preset information includes at least one of the following: a frequency band or a set of frequency band allowed by the sidelink interface of the terminal; a wireless access technology allowed by the terminal on the sidelink interface; a frequency band or a set of set of frequency bands and a radio access technology corresponding to the frequency band or the set of frequency band allowed by the terminal on the sidelink interface; a logical channel identifier corresponding to each logical channel of the sidelink interface of the terminal; all QoS parameters or QoS parameters corresponding to the current logical channel or QoS parameters corresponding to a logical channel that currently has data to be sent allowed by the sidelink interface of the terminal; QoS parameters corresponding to each logical channel of the sidelink interface of the terminal.

Here, the terminal reports the preset information of the sidelink, so that the base station configures the resource allocation mode configuration information for the terminal according to the preset information.

According to the resource allocation mode determining method of some embodiments of the present disclosure, the resource allocation mode configuration information of the sidelink interface of the terminal is obtained; in the case that the resource allocation mode configuration information includes at least two resource allocation modes, a resource allocation mode allowed by the terminal on the preset frequency band at a preset time is determined from the at least two resource allocation modes, so that the terminal can select a resource allocation mode allowed on the specific frequency band from the plurality of resource allocation modes of the sidelink interface.

Figure 3:
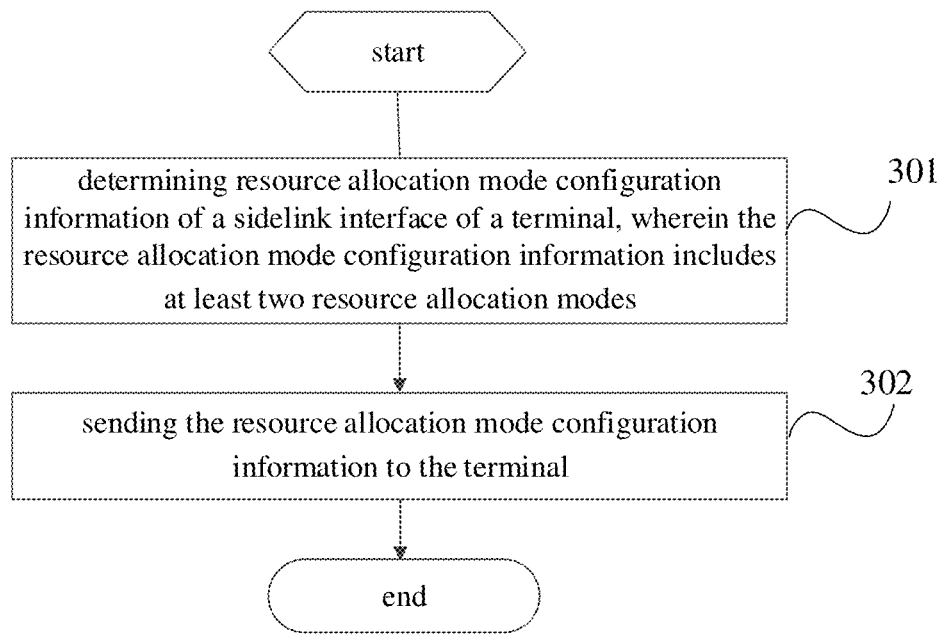
FIG. 3 is another schematic flowchart of a resource allocation mode determining method according to some embodiments of the present disclosure.

As shown in FIG. 3, some embodiments of the present disclosure also provide a resource allocation mode determining method, which is applied to a network device, including the following steps.

Step 301: determining resource allocation mode configuration information of a sidelink interface of a terminal, wherein the resource allocation mode configuration information includes at least two resource allocation modes.

Wherein, the resource allocation mode configuration information includes at least one of the following: a resource allocation mode allowed by the terminal on the sidelink interface; a resource allocation mode allowed by the terminal in each frequency band or a set of frequency band of the sidelink interface; a resource allocation mode allowed by the terminal for each wireless access technology allowed by the sidelink interface; a resource allocation mode allowed by the terminal for each set of quality of service (QoS) parameters on the sidelink interface; a resource allocation mode allowed for the terminal for each logical channel on the sidelink interface; for each frequency band or set of frequency band, a resource allocation mode allowed by each logical channel of the sidelink interface of the terminal in the frequency band or set of frequency band; for each wireless access technology, a resource allocation mode allowed by each logical channel of the sidelink interface of the terminal when using the wireless access technology.

In addition, the resource allocation mode allowed by the terminal is configured according to a protocol version allowed by the terminal on the sidelink interface.

Step 302: sending the resource allocation mode configuration information to the terminal.

In the resource allocation mode determining method of some embodiments of the present disclosure, the resource allocation mode configuration information of the sidelink interface of the terminal is determined, and the resource allocation mode configuration information is sent to the terminal, so that the terminal can select resource allocation mode to use on specific frequency band from a plurality of resource allocation modes of the sidelink interface.

Further, the determining the resource allocation mode configuration information of the sidelink interface of the terminal includes: obtaining the preset information of the sidelink reported by the terminal; determining the resource allocation mode configuration information of the sidelink interface of the terminal according to the preset information of the sidelink.

The preset information includes at least one of the following: a frequency band or a set of frequency band allowed by the sidelink interface of the terminal; a wireless access technology allowed by the terminal on the sidelink interface; a frequency band or a set of set of frequency bands and a radio access technology corresponding to the frequency band or the set of frequency band allowed by the terminal on the sidelink interface; a logical channel identifier corresponding to each logical channel of the sidelink interface of the terminal; all QoS parameters or QoS parameters corresponding to the current logical channel or QoS parameters corresponding to a logical channel that currently has data to be sent allowed by the sidelink interface of the terminal; QoS parameters corresponding to each logical channel of the sidelink interface of the terminal.

Further, the determining the resource allocation mode configuration information of the sidelink interface of the terminal according to the preset information of the sidelink communication link includes: determining the resource allocation mode allowed by the terminal on the sidelink interface according to the preset information of the sidelink; determining the resource allocation mode configuration information of the terminal according to the resource allocation mode allowed by the terminal on the sidelink interface.

Wherein, the determining the resource allocation mode allowed by the terminal on the sidelink interface according to the preset information of the sidelink includes at least one of the following: determining the resource allocation allowed by the terminal on the sidelink interface based on the terminal; determining the resource allocation mode allowed by the terminal based on each frequency band or a set of frequency band of the sidelink interface of the terminal; determining the resource allocation mode allowed by the terminal based on each wireless access technology allowed by the terminal on the sidelink interface; determining the resource allocation mode allowed by the terminal based on each set of QoS parameters of the sidelink interface; separately determining the resource allocation mode allowed by each logical channel of the sidelink interface of the terminal based on each logical channel of the sidelink of the terminal; for each frequency band or the set of frequency band, determining the resource allocation mode allowed by the terminal based on each logical channel of the sidelink of the terminal; for each wireless access technology, determining the resource allocation mode allowed by the terminal based on each logical channel of the sidelink of the terminal.

Further, after separately determining the resource allocation mode allowed by each logical channel of the terminal on the sidelink interface based on each logical channel of the sidelink interface of the terminal, the method further includes: configuring a resource allocation mode corresponding to the frequency band or the set of frequency band or the radio access technology for each logical channel.

The method for determining the resource allocation mode in some embodiments of the present disclosure further includes: configuring a priority of the resource allocation mode and sending the priority to the terminal.

Specifically, before sending the resource allocation mode configuration information to the terminal, the priority of the resource allocation mode may be configured and sent to the terminal.

Further, the configuring the priority of the resource allocation mode includes: configuring the priority of the resource allocation mode based on the terminal; or separately configuring the priority of the resource allocation mode based on each frequency band or the set of frequency band of the sidelink interface; or separately configuring the priority of the resource allocation mode based on each logical channel of the sidelink interface; or separately configuring the priority of the resource allocation mode based on each set of QoS parameters of the sidelink interface.

Further, after the configuring the priority of the resource allocation mode based on each logical channel of the sidelink interface, the method further includes: configuring the priority of the resource allocation mode allowed by each frequency band or the set of frequency band of each logical channel or the wireless access technology.

Here, the network device configures the priority of the resource allocation mode based on the terminal; or based on each frequency band (such as BWP or carrier) or a set of frequency band of the sidelink interface; or based on each logical channel of the sidelink interface. Further, priorities among the plurality of resource allocation modes allowed for each logic channel can be configured based on each frequency band or the set of frequency band or the radio access technology, or the priorities of the at least two resource allocation modes are separately configured based on each set of QoS parameters of the sidelink interface.

Some embodiments of the present disclosure are described by taking NR as an example, where the resource allocation mode scheduled by the network is called Mode 1, and the resource allocation mode selected by the terminal is called Mode 2.

Figure 4:
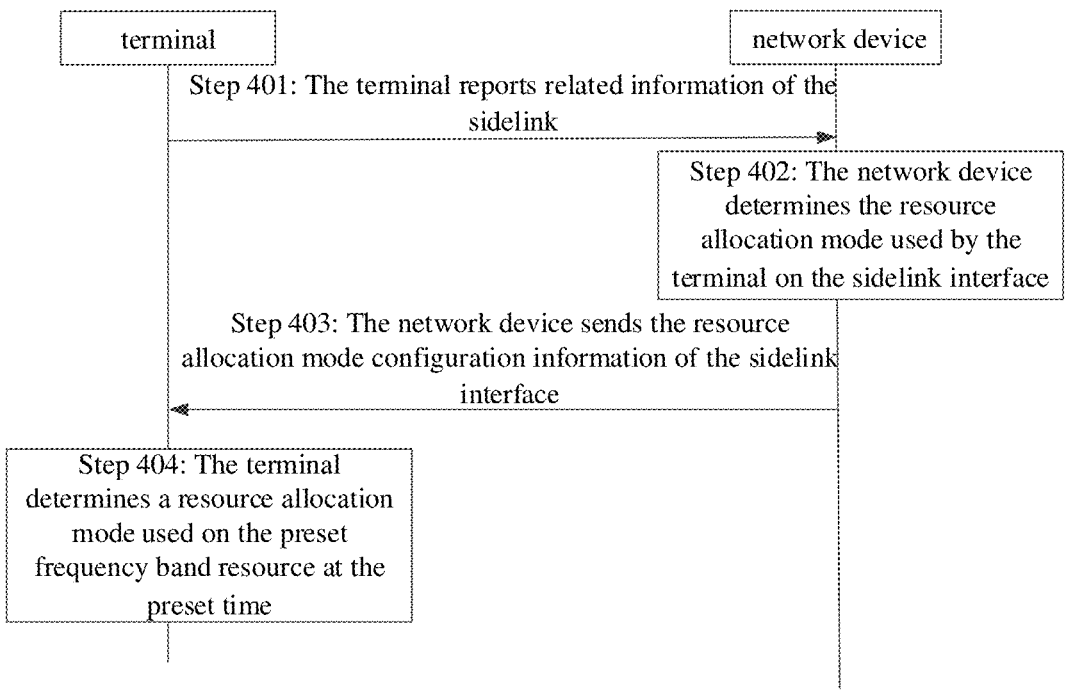
FIG. 4 is a schematic diagram of interaction between a terminal and a network device in some embodiments of the present disclosure.

As shown in FIG. 4, it includes the following steps.

Step 401: The terminal reports related information of the sidelink.

The terminal reports the related information of the sidelink to the network device. The specific report can reuse the SidelinkUEInformation message of the LTE system, but the content included in the message may change. For example, one or a combination of the following information may be added: the frequency band or the set of frequency band allowed by the sidelink interface of the terminal; the wireless access technology allowed by the sidelink interface of the terminal; the frequency band or the set of frequency band, and the radio access technology corresponding to the frequency band resources or the set of frequency band allowed by the terminal on the sidelink interface; the logical channel identifier corresponding to each logical channel of the sidelink interface of the terminal, such as LCID; all QoS parameters or the QoS parameters corresponding to the current logical channel or the QoS parameters corresponding to the logical channel that currently has data to be sent allowed by the sidelink interface of the terminal; the QoS parameters corresponding to each logical channel of the sidelink interface of the terminal.

Step 402: The network device determines the resource allocation mode allowed by the terminal on the sidelink interface.

Here, the network device determines the resource allocation mode allowed by the terminal on the sidelink interface, and the specific determination method can be any of the following.

The resource allocation mode allowed by the terminal on the sidelink interface is determined based on the terminal.

The resource allocation mode allowed by the terminal is determined based on each frequency band or the set of frequency band of the sidelink interface of the terminal.

The resource allocation mode allowed by the terminal is determined based on the wireless access technology allowed by the terminal on the sidelink interface.

The resource allocation mode useable by each logical channel of the terminal on the sidelink interface is determined based on each logical channel of the sidelink of the terminal. Further, the resource allocation mode corresponding to each frequency band or the set of frequency band or the radio access technology can also be configured for each logical channel.

Step 403: The network device sends the resource allocation mode configuration information of the sidelink interface.

In this step, the network device configures the resource allocation mode allowed by the terminal on the sidelink interface through radio resource control RRC signaling. The specific configuration method can be any of the following.

The resource allocation mode allowed by the terminal on the sidelink interface is configured based on the terminal. For example, in the NR system, the network can configure the terminal to only use Mode 1, or only use Mode 2, or use both Mode 1 and Mode 2; configuring the resource allocation mode allowed by the terminal based on each frequency band or the set of frequency band of the sidelink interface of the terminal.

The frequency band in some embodiments of the present disclosure refers to a band width part (BWP) in NR.

The set of frequency band may be a set composed by frequency bands that use the same radio access technology. The mapping relationship between the frequency band and the set of frequency band may be determined by the terminal according to the wireless access technology allowed by the frequency band, or may be notified by the network.

Taking the configuring the resource allocation mode allowed by the terminal based on the set of frequency band as an example, in the NR system, the network configures the resource allocation mode allowed by the terminal based on the set of frequency band. For example, for BWP group 0, the network configures that terminal can only use Mode 1.

For BWP group 1, the network configures that the terminal can use Mode 1 and Mode 2 at the same time.

The resource allocation mode allowed by the terminal is configured based on the wireless access technology allowed by the terminal on the sidelink interface.

For example, in the NR system, the network configures that the terminal uses Mode 3 resource allocation mode on the sidelink interface based on the frequency band of the LTE wireless access technology; at the same time, the network configures that the terminal uses the Mode 1 and Mode 2 at the same time on the sidelink interface based on the frequency band of the NR wireless access technology.

The resource allocation mode allowed by each logical channel of the terminal on the sidelink interface is configured base on each logical channel of the sidelink interface of the terminal. Further, the resource allocation mode corresponding to each frequency band or the set of frequency band or the radio access technology can also be configured for each logical channel.

Taking the configuring based on each logical channel as an example, in the NR system, the network side configures only the resource allocation mode 0 allowed for the logical channel of the sidelink interface, and Mode 1 and Mode allowed for the logic channel 2 at the same time.

Step 404: The terminal determines a resource allocation mode allowed on the preset frequency band at the preset time.

Here, according to the configuration information of step 403, if the terminal determines that the two resource allocation modes are to be allowed at the same time on the preset frequency band of the sidelink interface, since the terminal cannot transmit two transmission blocks on the same frequency band at the same time, the terminal can only use one resource allocation mode at any time on the preset frequency band, and the specific resource allocation mode to be allowed needs to be determined according to a specific rule.

The specific rule may be that the terminal determines which resource allocation mode to use according to the protocol. The protocol may have the following two types.

The first type: the protocol defines that the resource allocation mode scheduled by the network always takes precedence over the resource allocation mode selected by the terminal.

The second type: the protocol defines that he resource allocation mode selected by the terminal always takes precedence over the resource allocation mode scheduled by the network.

The first type is taken as an example for illustration.

In step 403, if the network configures the terminal to use two resource allocation modes of both the Mode 1 and the Mode 2 at the same time on the frequency band based on the frequency band or the set of frequency band, if the protocol defines that the resource allocation mode scheduled by the network always takes precedence over the resource allocation mode selected by the terminal, the terminal prefers to use the resource allocation mode of Mode 1.

The specific rule may also be that the network configures priorities between the resource allocation mode scheduled by the network and the resource allocation mode selected by the terminal. There are the following specific configuration methods: configuring based on the terminal; separately configuring based on each frequency band or the set of frequency band of the sidelink interface; separately configuring based on each logical channel of the sidelink interface. Further, priorities among the plurality of resource allocation modes allowed for each logical channel may be configured based on each frequency band or the set of frequency band or the radio access technology.

The configuring the priority of the resource allocation mode allowed by the terminal based on the terminal as an example is taken as an example.

In step 403, if the network configures the terminal to use two resource allocation modes of both the Mode 1 and the Mode 2 at the same time on the frequency band based on the frequency band or the set of frequency band, the network configures the priorities of the two resource allocation modes of both the Mode 1 and the Mode 2 based on the terminal. For example, if the network configures that terminal preferentially uses the resource allocation mode of Mode 2, the terminal will preferentially select the resource allocation mode of Mode 2. Only if the Mode 2 resource pool is not configured on the frequency band, the resource allocation mode of Mode 1 will be allowed.

Separately configuring the priority of the resource allocation mode based on each frequency band or the set of frequency band of the sidelink interface is taken as an example.

In step 403, if the network configures the terminal to use two resource allocation modes of both the Mode 1 and the Mode 2 at the same time on the frequency band based on the frequency band or the set of frequency band, the network configures the priorities of the two resource allocation modes of both the Mode 1 and the Mode 2 based on the frequency band or the set of frequency band. For example, if the network configures that terminal preferentially uses the resource allocation mode of Mode 2 on the frequency band, the terminal will preferentially select the resource allocation mode of Mode 2. Only if the Mode 2 resource pool is not configured on the frequency band, the resource allocation mode of Mode 1 will be allowed.

Separately configuring the priority of the resource allocation mode based on each logic channel of the sidelink interface is taken as an example.

In step 403, if the network configures the terminal to use two resource allocation modes of both the Mode 1 and the Mode 2 at the same time on the frequency band based on the frequency band or the set of frequency band, the network configures the priorities of the two resource allocation modes of both the Mode 1 and the Mode 2 based on the logic channel, the terminal first needs to know which logic channels may use the frequency band, for example, logical channel 1 and logical channel 2 can use the frequency band. For logical channel 1, the priority order of the resource allocation mode configured by the network is Mode 2 prior to Mode 1, and for logical channel 2, the priority order of the resource allocation mode configured by the network is Mode 1 prior to Mode 2, and the terminal needs to first determine the data currently to be transmitted is for logical channel 1 or logical channel 2, and thus the specific resource allocation mode is allowed on the frequency band. For example, if data for logical channel 1 is selected to be transmitted, the resource allocation mode of Mode 2 is preferentially allowed.

The specific rule may also be that the sidelink communication terminal determines the priority between the resource allocation mode scheduled by the network and the resource allocation mode selected by the terminal at any time on the specific frequency band. The specific rule can be as follows:

Method 1: for any time T, the terminal first determines the priorities between logical channels with available data in the current buffer that are used to be transmitted on the frequency band, and selects the logical channel with the highest priority. The resource allocation mode of the sidelink interface that needs to be allowed at time T on the specific frequency band is determined according to the logical channel with the highest priority.

Method 2: for any time T, the terminal first determines logical channels with available data in the current buffer that are used to be transmitted on the frequency band, and selects the logical channel with the highest delay requirement. The resource allocation mode of the sidelink interface that needs to be allowed at time T on the specific frequency band is determined according to the logical channel with the highest delay requirement.

Method 1 is taken as an example for illustration.

In step 403, if the network configures the terminal to use two resource allocation modes of both the Mode 1 and the Mode 2 at the same time on the frequency band based on the frequency band or the set of frequency band, the terminal acts as follows: the terminal first determines the logical channel that can use the frequency band (BWP), for example, logical channel 1 and logical channel 2 can use the frequency band, and then according to the priorities of logical channel 1 and logical channel 2, it is determined that the logical channel 2 has a higher priority, and the logical channel 2 is suitable for using the resource allocation mode of Mode 2, and then it is determined that the terminal preferentially uses the resource allocation mode of Mode 2 on the frequency band.

According to the resource determination method of some embodiments of the present disclosure, the resource allocation mode configuration information of the sidelink interface of the terminal is determined, and the resource allocation mode configuration information is sent to the terminal, so that the terminal can select a resource allocation mode allowed on a specific frequency band from a plurality of resource allocation modes of the sidelink interface.

Figure 5:
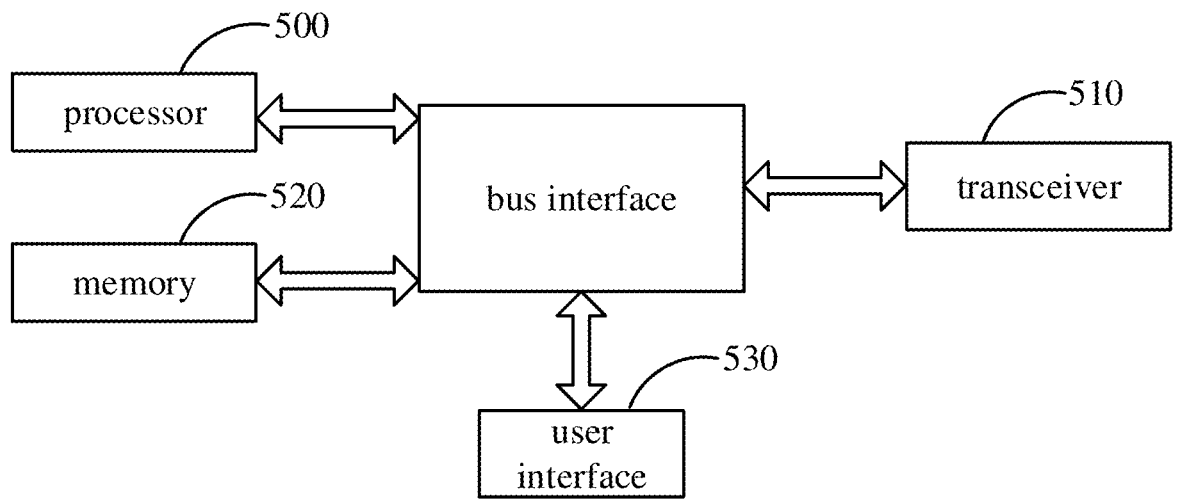
FIG. 5 is a structural block diagram of a terminal in some embodiments of the present disclosure.

As shown in FIG. 5, some embodiments of the present disclosure also provide a terminal, including: a transceiver, a memory, a processor, and a program stored in the memory and executed by the processor to implement the following steps: obtaining resource allocation mode configuration information of a sidelink interface of a terminal.

In a case that the resource allocation mode configuration information includes at least two resource allocation modes, a resource allocation mode allowed by the terminal on the preset frequency band at the preset time is determined from the at least two resource allocation modes.

In FIG. 5, the bus architecture may include any number of interconnected buses and bridges. Specifically, various circuits of one or more processors represented by the processor 500 and the memory represented by the memory 520 are linked together. The bus architecture can also link various other circuits such as peripheral devices, voltage regulators, power management circuits, etc., which are all known in the art, and therefore, no further description will be given herein. The bus interface provides the interface. The transceiver 510 may be a plurality of elements, that is, including a transmitter and a transceiver, and provide a unit for communicating with various other devices on a transmission medium. For different user devices, the user interface 530 may also be an interface capable of connecting externally and internally with the required device. The connected equipment includes but not limited to a keypad, a display, a speaker, a microphone, a joystick, and the like.

The processor 500 is responsible for managing the bus architecture and general processing, and the memory 520 can store data allowed by the processor 500 when performing operations.

Optionally, the resource allocation mode configuration information includes at least one of the following: a resource allocation mode allowed by the terminal on the sidelink interface; a resource allocation mode allowed by the terminal in each frequency band or a set of frequency band of the sidelink interface; a resource allocation mode allowed by the terminal for each wireless access technology allowed by the sidelink interface; a resource allocation mode allowed by the terminal for each set of quality of service (QoS) parameters on the sidelink interface; a resource allocation mode allowed for the terminal for each logical channel on the sidelink interface; for each frequency band or set of frequency band, a resource allocation mode allowed by each logical channel of the sidelink interface of the terminal in the frequency band or set of frequency band; for each wireless access technology, a resource allocation mode allowed by each logical channel of the sidelink interface of the terminal when using the wireless access technology.

Optionally, the processor 500 is further configured to read a program in the memory 520, and perform the following steps: determining a resource allocation mode allowed by the terminal on the preset frequency band at the preset time according to the priorities of the at least two resource allocation modes agreed in the protocol.

Optionally, the at least two resource allocation modes include: the resource allocation mode scheduled by the network and the resource allocation mode selected by the terminal. In the protocol, the priority of the resource allocation mode scheduled by the network is higher than the priority of the resource allocation mode selected by the terminal; or, the priority of the resource allocation mode selected by the terminal is higher than the priority of the resource allocation mode scheduled by the network.

Optionally, the processor 500 is further configured to read a program in the memory 520, and execute the following steps: determining a resource allocation mode allowed by the terminal on the preset frequency band at the preset time according to the priorities of the at least two resource allocation modes configured by the network device.

Optionally, the priorities of the at least two resource allocation modes are configured by the network device based on the terminal, or separately configured based on each frequency band or set of frequency band of the sidelink interface, separately configured based on each logic channel of the sidelink interface, or separately configured based on each set of QoS parameters of the sidelink interface.

Optionally, the processor 500 is further configured to read a program in the memory 520, and execute the following steps: determining resource allocation mode allowed on the preset frequency band at the preset time from the at least two resource allocation modes according to the priorities of the at least two resource allocation modes determined by the terminal.

Optionally, the processor 500 is further configured to read a program in the memory 520, and execute the following steps: determining the priorities of the at least two resource allocation modes according to a priority of a resource allocation mode configured for a target logical channel, wherein, the target logical channel is a logical channel with the highest priority or having the highest latency requirement in the preset logical channel set, and the preset logical channel set refers to a set of logic channels which is used to be transmitted on the preset frequency band at the present time and has available data on the current buffer.

Optionally, the processor 500 is further configured to read a program in the memory 520, and execute the following steps: reporting the preset information of the sidelink.

The preset information includes at least one of the following: a frequency band or a set of frequency band allowed by the sidelink interface of the terminal; a wireless access technology allowed by the terminal on the sidelink interface; a frequency band or a set of set of frequency bands and a radio access technology corresponding to the frequency band or the set of frequency band allowed by the terminal on the sidelink interface; a logical channel identifier corresponding to each logical channel of the sidelink interface of the terminal; all QoS parameters or QoS parameters corresponding to the current logical channel or QoS parameters corresponding to a logical channel that currently has data to be sent allowed by the sidelink interface of the terminal; QoS parameters corresponding to each logical channel of the sidelink interface of the terminal.

The terminal according to some embodiments of the present disclosure obtains the resource allocation mode configuration information of the sidelink interface of the terminal; in the case that the resource allocation mode configuration information includes at least two resource allocation modes, a resource allocation mode allowed by the terminal on the preset frequency band at the preset time is determined from the at least two resource allocation modes, so that the terminal can select a resource allocation mode from the plurality of resource allocation modes of the sidelink interface to use on a specific frequency band.

In some embodiments of the present disclosure, a computer-readable storage medium is also provided, on which a computer program is stored, and when the program is executed by a processor, the following steps are implemented: obtaining resource allocation mode configuration information of a sidelink interface of a terminal.

In a case that the resource allocation mode configuration information includes at least two resource allocation modes, a resource allocation mode allowed by the terminal on the preset frequency band at the preset time is determined from the at least two resource allocation modes.

When the program is executed by the processor, all the implementation in the foregoing embodiment of the resource allocation mode determining method applied to the terminal side can be implemented. To avoid repetition, details are not described herein again.

Figure 6:
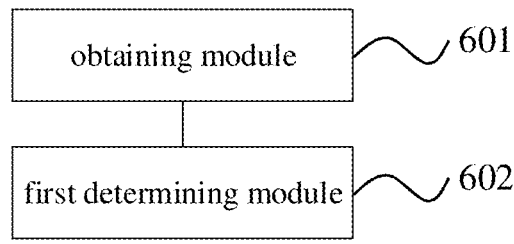
FIG. 6 is a schematic diagram of modules of a terminal in some embodiments of the present disclosure.

As shown in FIG. 6, some embodiments of the present disclosure also provide a terminal, including: an obtaining module 601, configured to obtain resource allocation mode configuration information of a sidelink interface of a terminal; a first determining module 602, configured to, in a case that the resource allocation mode configuration information includes at least two resource allocation modes, determine a resource allocation mode allowed by the terminal on the preset frequency band at the preset time from the at least two resource allocation modes.

In the terminal of some embodiments of the present disclosure, the resource allocation mode configuration information includes at least one of the following: a resource allocation mode allowed by the terminal on the sidelink interface; a resource allocation mode allowed by the terminal in each frequency band or a set of frequency band of the sidelink interface; a resource allocation mode allowed by the terminal for each wireless access technology allowed by the sidelink interface; a resource allocation mode allowed by the terminal for each set of quality of service (QoS) parameters on the sidelink interface; a resource allocation mode allowed for the terminal for each logical channel on the sidelink interface; for each frequency band or set of frequency band, a resource allocation mode allowed by each logical channel of the sidelink interface of the terminal in the frequency band or set of frequency band; for each wireless access technology, a resource allocation mode allowed by each logical channel of the sidelink interface of the terminal when using the wireless access technology.

In the terminal of some embodiments of the present disclosure, the first determining module 602 is configured to determine a resource allocation mode allowed by the terminal on the preset frequency band at the preset time according to the priorities of the at least two resource allocation modes agreed in the protocol.

In the terminal according to some embodiments of the present disclosure, the at least two resource allocation modes include: the resource allocation mode scheduled by the network and the resource allocation mode selected by the terminal. In the protocol, the priority of the resource allocation mode scheduled by the network is higher than the priority of the resource allocation mode selected by the terminal; or, the priority of the resource allocation mode selected by the terminal is higher than the priority of the resource allocation mode scheduled by the network.

In the terminal of some embodiments of the present disclosure, the first determining module 602 is configured to determine a resource allocation mode allowed by the terminal on the preset frequency band at the preset time according to the priorities of the at least two resource allocation modes configured by the network device.

In the terminal of some embodiments of the present disclosure, the priorities of the at least two resource allocation modes are configured by the network device based on the terminal, or separately configured based on each frequency band or set of frequency band of the sidelink interface, separately configured based on each logic channel of the sidelink interface, or separately configured based on each set of QoS parameters of the sidelink interface.

In the terminal of some embodiments of the present disclosure, the first determining module 602 is configured to determine resource allocation mode allowed on the preset frequency band at the preset time from the at least two resource allocation modes according to the priorities of the at least two resource allocation modes determined by the terminal.

The terminal of some embodiments of the present disclosure further includes: a third determining module, configured to determine the priorities of the at least two resource allocation modes according to a priority of a resource allocation mode configured for a target logical channel, wherein, the target logical channel is a logical channel with the highest priority or having the highest latency requirement in the preset logical channel set, and the preset logical channel set refers to a set of logic channels which is used to be transmitted on the preset frequency band at the present time and has available data on the current buffer.

The terminal of some embodiments of the present disclosure further includes: a reporting module, configured to report the preset information of the sidelink.

The preset information includes at least one of the following: a frequency band or a set of frequency band allowed by the sidelink interface of the terminal; a wireless access technology allowed by the terminal on the sidelink interface; a frequency band or a set of set of frequency bands and a radio access technology corresponding to the frequency band or the set of frequency band allowed by the terminal on the sidelink interface; a logical channel identifier corresponding to each logical channel of the sidelink interface of the terminal; all QoS parameters or QoS parameters corresponding to the current logical channel or QoS parameters corresponding to a logical channel that currently has data to be sent allowed by the sidelink interface of the terminal; QoS parameters corresponding to each logical channel of the sidelink interface of the terminal.

The terminal according to some embodiments of the present disclosure obtains the resource allocation mode configuration information of the sidelink interface of the terminal; in the case that the resource allocation mode configuration information includes at least two resource allocation modes, a resource allocation mode allowed by the terminal on the preset frequency band at the preset time is determined from the at least two resource allocation modes, so that the terminal can select a resource allocation mode from the plurality of resource allocation modes of the sidelink interface to use on a specific frequency band.

Figure 7:
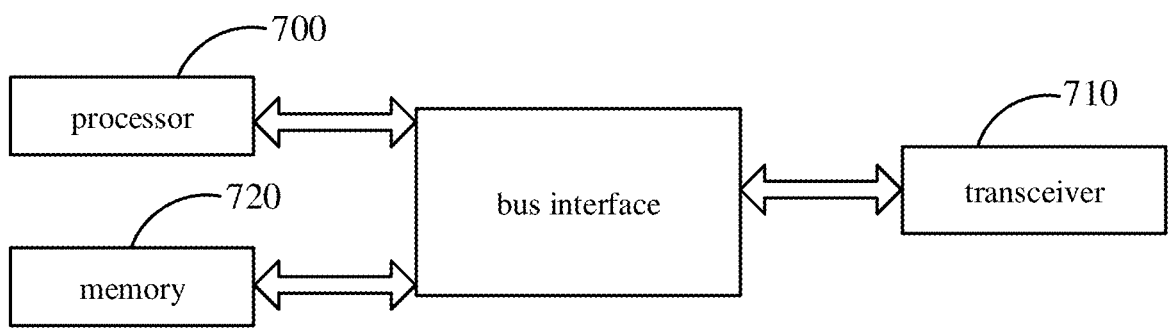
FIG. 7 is a structural block diagram of a network device in some embodiments of the disclosure.

As shown in FIG. 7, some embodiments of the present disclosure also provide a network device. The network device may be specifically a base station, including a memory 720, a processor 700, a transceiver 710, a bus interface, and a computer program stored on the memory 720 and executed by the processor 700, where the processor 700 is used to read the program in the memory 720 and execute the following process: determining resource allocation mode configuration information of a sidelink interface of a terminal, wherein the resource allocation mode configuration information includes at least two resource allocation modes; sending the resource allocation mode configuration information to the terminal through the transceiver.

In FIG. 7, the bus architecture may include any number of interconnected buses and bridges. Specifically, various circuits of one or more processors represented by the processor 700 and the memory represented by the memory 720 are linked together. The bus architecture can also link various other circuits such as peripheral devices, voltage regulators, power management circuits, etc., which are all known in the art, and therefore, no further description will be given herein. The bus interface provides the interface. The transceiver 710 may be a plurality of elements, including a transmitter and a transceiver, and provide a unit for communicating with various other devices on a transmission medium. The processor 700 is responsible for managing the bus architecture and general processing, and the memory 720 can store data allowed by the processor 700 when performing operations.

Optionally, the processor 700 is further configured to read a program in the memory 720, and execute the following steps: obtaining the preset information of the sidelink reported by the terminal; determining the resource allocation mode configuration information of the sidelink interface of the terminal according to the preset information of the sidelink.

The preset information includes at least one of the following: a frequency band or a set of frequency band allowed by the sidelink interface of the terminal; a wireless access technology allowed by the terminal on the sidelink interface; a frequency band or a set of set of frequency bands and a radio access technology corresponding to the frequency band or the set of frequency band allowed by the terminal on the sidelink interface; a logical channel identifier corresponding to each logical channel of the sidelink interface of the terminal; all QoS parameters or QoS parameters corresponding to the current logical channel or QoS parameters corresponding to a logical channel that currently has data to be sent allowed by the sidelink interface of the terminal; QoS parameters corresponding to each logical channel of the sidelink interface of the terminal.

Optionally, the processor 700 is further configured to read a program in the memory 720, and execute the following steps: determining the resource allocation mode allowed by the terminal on the sidelink interface according to the preset information of the sidelink; determining the resource allocation mode configuration information of the terminal according to the resource allocation mode allowed by the terminal on the sidelink interface.

Optionally, the processor 700 is further configured to read a program in the memory 720, and execute at least one of the following methods: determining the resource allocation allowed by the terminal on the sidelink interface based on the terminal; determining the resource allocation mode allowed by the terminal based on each frequency band or a set of frequency band of the sidelink interface of the terminal; determining the resource allocation mode allowed by the terminal based on each wireless access technology allowed by the terminal on the sidelink interface; determining the resource allocation mode allowed by the terminal based on each set of QoS parameters of the sidelink interface; separately determining the resource allocation mode allowed by each logical channel of the sidelink interface of the terminal based on each logical channel of the sidelink of the terminal; for each frequency band or the set of frequency band, determining the resource allocation mode allowed by the terminal based on each logical channel of the sidelink of the terminal; for each wireless access technology, determining the resource allocation mode allowed by the terminal based on each logical channel of the sidelink of the terminal.

Optionally, the processor 700 is further configured to read a program in the memory 720, and execute the following steps: configuring a resource allocation mode corresponding to the frequency band or the set of frequency band or the radio access technology for each logical channel.

Optionally, the processor 700 is further configured to read a program in the memory 720, and execute the following steps: configuring a priority of the resource allocation mode and sending the priority to the terminal.

Optionally, the processor 700 is further configured to read a program in the memory 720, and execute the following steps: configuring the priority of the resource allocation mode based on the terminal; or separately configuring the priority of the resource allocation mode based on each frequency band or the set of frequency band of the sidelink interface; or separately configuring the priority of the resource allocation mode based on each logical channel of the sidelink interface; or separately configuring the priority of the resource allocation mode based on each set of QoS parameters of the sidelink interface.

Optionally, the processor 700 is further configured to read a program in the memory 720, and execute the following steps: configuring the priority of the resource allocation mode allowed by each frequency band or the set of frequency bandd of each logical channel or the wireless access technology.

The network device of some embodiments of the present disclosure determines the resource allocation mode configuration information of the sidelink interface of the terminal, and sends the resource allocation mode configuration information to the terminal, so that the terminal can select one resource allocation mode allowed on specific frequency band from the plurality resource allocation modes of the sidelink interface.

In some embodiments of the present disclosure, a computer-readable storage medium is also provided, on which a computer program is stored, and when the program is executed by a processor, the following steps are implemented: determining resource allocation mode configuration information of a sidelink interface of a terminal, wherein the resource allocation mode configuration information includes at least two resource allocation modes; sending the resource allocation mode configuration information to the terminal.

When the program is executed by the processor, all the implementation in the above-mentioned method embodiment applied to the network device side can be realized. To avoid repetition, details are not described herein again.

Figure 8:
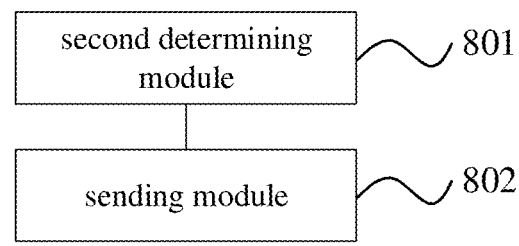
FIG. 8 is a schematic diagram of modules of a network device in some embodiments of the present disclosure.

As shown in FIG. 8, some embodiments of the present disclosure also provide a network device, including: a second determining module 801, configured to determine resource allocation mode configuration information of a sidelink interface of a terminal, wherein the resource allocation mode configuration information includes at least two resource allocation modes; a sending module 802, configured to send the resource allocation mode configuration information to the terminal.

In the network device of some embodiments of the present disclosure, the second determining module 801 includes: a first obtaining sub-module, configured to obtain the preset information of the sidelink reported by the terminal; a first determining sub-module, configured to determine the resource allocation mode configuration information of the sidelink interface of the terminal according to the preset information of the sidelink.

Wherein, the preset information includes at least one of the following: a frequency band or a set of frequency band allowed by the sidelink interface of the terminal; a wireless access technology allowed by the terminal on the sidelink interface; a frequency band or a set of set of frequency bands and a radio access technology corresponding to the frequency band or the set of frequency band allowed by the terminal on the sidelink interface; a logical channel identifier corresponding to each logical channel of the sidelink interface of the terminal; all QoS parameters or QoS parameters corresponding to the current logical channel or QoS parameters corresponding to a logical channel that currently has data to be sent allowed by the sidelink interface of the terminal; QoS parameters corresponding to each logical channel of the sidelink interface of the terminal.

In the network device of some embodiments of the present disclosure, the first determining sub-module includes: a first determining unit, configured to determine the resource allocation mode allowed by the terminal on the sidelink interface according to the preset information of the sidelink; a second determining unit, configured to determine the resource allocation mode configuration information of the terminal according to the resource allocation mode allowed by the terminal on the sidelink interface.

In the network device of some embodiments of the present disclosure, the first determining unit is configured to implement at least one of the following methods: determining the resource allocation allowed by the terminal on the sidelink interface based on the terminal; determining the resource allocation mode allowed by the terminal based on each frequency band or a set of frequency band of the sidelink interface of the terminal; determining the resource allocation mode allowed by the terminal based on each wireless access technology allowed by the terminal on the sidelink interface; determining the resource allocation mode allowed by the terminal based on each set of QoS parameters of the sidelink interface; separately determining the resource allocation mode allowed by each logical channel of the sidelink interface of the terminal based on each logical channel of the sidelink of the terminal; for each frequency band or the set of frequency band, determining the resource allocation mode allowed by the terminal based on each logical channel of the sidelink of the terminal; for each wireless access technology, determining the resource allocation mode allowed by the terminal based on each logical channel of the sidelink of the terminal.

In the network device of some embodiments of the present disclosure, the first determining sub-module further includes: a configuring unit, configured to configure a resource allocation mode corresponding to the frequency band or the set of frequency band or the radio access technology for each logical channel.

The network device of some embodiments of the present disclosure further includes: a configuring module, configured to configure a priority of the resource allocation mode and sending the priority to the terminal.

In the network device of some embodiments of the present disclosure, the configuring module is configured to configure the priority of the resource allocation mode based on the terminal; or separately configure the priority of the resource allocation mode based on each frequency band or the set of frequency band of the sidelink interface; or separately configure the priority of the resource allocation mode based on each logical channel of the sidelink interface; or separately configure the priority of the resource allocation mode based on each set of QoS parameters of the sidelink interface.

In the network device of some embodiments of the present disclosure, the configuration module is further configured to configure the priority of each frequency band or set of frequency band or the resource allocation mode used to be allowed by the radio access technology set of each logical channel.

The network device of some embodiments of the present disclosure determines the resource allocation mode configuration information of the sidelink interface of the terminal, and sends the resource allocation mode configuration information to the terminal, so that the terminal can select one resource allocation mode allowed on specific frequency band from the plurality of resource allocation modes of the sidelink interface.

In the various embodiments of the present disclosure, it should be understood that the value of the sequence number of the foregoing processes does not mean the order of execution. The execution order of each process should be determined by the function and internal logic thereof, and should not constitute any limitation for some implementations of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A resource allocation mode determining method applied to a terminal, comprising:
   obtaining resource allocation mode configuration information of a sidelink interface of a terminal;
   in a case that the resource allocation mode configuration information includes at least two resource allocation modes, selecting, from the at least two resource allocation modes, a resource allocation mode with a highest priority as a resource allocation mode allowed by the terminal on a preset frequency band at a preset time,
   wherein the preset time is any time when the terminal is capable of using at least two resource allocation modes simultaneously.

2. The method according to claim 1, wherein the resource allocation mode configuration information includes at least one of the following:
   a resource allocation mode allowed by the terminal on the sidelink interface;
   a resource allocation mode allowed by the terminal in each frequency band or a set of frequency band of the sidelink interface;
   a resource allocation mode allowed by the terminal for each wireless access technology allowed by the sidelink interface;
   a resource allocation mode allowed by the terminal for each set of quality of service (QoS) parameters on the sidelink interface;
   a resource allocation mode allowed by the terminal for each logical channel on the sidelink interface;
   for each frequency band or the set of frequency band, a resource allocation mode allowed by each logical channel of the sidelink interface of the terminal in the frequency band or the set of frequency band;
   for each wireless access technology, a resource allocation mode allowed by each logical channel of the sidelink interface of the terminal when using the wireless access technology.

3. The method according to claim 1, wherein selecting, from the at least two resource allocation modes, the resource allocation mode with the highest priority as the resource allocation mode allowed by the terminal on a preset frequency band at the preset time comprises:
   selecting a resource allocation mode allowed by the terminal on the preset frequency band at the preset time according to priorities of the at least two resource allocation modes agreed in a protocol,
   wherein the at least two resource allocation modes include: a resource allocation mode scheduled by the network and a resource allocation mode selected by the terminal;
   the protocol defines a priority of the resource allocation mode scheduled by the network is higher than a priority of the resource allocation mode selected by the terminal; or
   the protocol defines that the priority of the resource allocation mode selected by the terminal is higher than the priority of the resource allocation mode scheduled by the network.

4. The method according to claim 1, wherein selecting, from the at least two resource allocation modes, the resource allocation mode with the highest priority as the resource allocation mode allowed by the terminal on a preset frequency band at the preset time comprises:
   selecting a resource allocation mode allowed by the terminal on the preset frequency band at the preset time according to priorities of the at least two resource allocation modes configured by a network device.

5. The method according to claim 4, wherein the priorities of the at least two resource allocation modes are configured by the network device based on the terminal, or separately configured based on each frequency band or the set of frequency band of the sidelink interface, separately configured based on each logic channel of the sidelink interface, or separately configured based on each set of QoS parameters of the sidelink interface.

6. The method according to claim 1, wherein selecting, from the at least two resource allocation modes, the resource allocation mode with the highest priority as the resource allocation mode allowed by the terminal on a preset frequency band at the preset time comprises:

selecting a resource allocation mode allowed on the preset frequency band at the preset time from the at least two resource allocation modes according to the priorities of the at least two resource allocation modes determined by the terminal.

7. The method according to claim 6, wherein selecting the resource allocation mode allowed on the preset frequency band at the preset time from the at least two resource allocation modes according to the priorities of the at least two resource allocation modes determined by the terminal further comprises:
  determining the priorities of the at least two resource allocation modes according to a priority of a resource allocation mode configured for a target logical channel, wherein the target logical channel is a logical channel with a highest priority or having a highest latency requirement in a preset logical channel set, and the preset logical channel set refers to a set of logic channels which are used to be transmitted on the preset frequency band at the present time and have available data on a current buffer.

8. The method according to claim 1, wherein before obtaining the resource allocation mode configuration information of the sidelink interface of the terminal, the method further comprises:
  reporting preset information of the sidelink;
  the preset information includes at least one of the following:
    a frequency band or a set of frequency band allowed by the sidelink interface of the terminal;
    a wireless access technology allowed by the terminal on the sidelink interface;
    a frequency band or a set of frequency band and a radio access technology corresponding to the frequency band or the set of frequency band allowed by the terminal on the sidelink interface;
    a logical channel identifier corresponding to each logical channel of the sidelink interface of the terminal;
    all QoS parameters or QoS parameters corresponding to a current logical channel or QoS parameters corresponding to a logical channel that currently has data to be sent allowed by the sidelink interface of the terminal; QoS parameters corresponding to each logical channel of the sidelink interface of the terminal.

9. A resource allocation mode determining method applied to a network device, comprising:
  determining resource allocation mode configuration information of a sidelink interface of a terminal, wherein the resource allocation mode configuration information includes at least two resource allocation modes;
  sending the resource allocation mode configuration information to the terminal, wherein the resource allocation mode configuration information enables the terminal to select, from the at least two resource allocation modes, a resource allocation mode with a highest priority as a resource allocation mode allowed by the terminal on a preset frequency band at a preset time,
  wherein the preset time is any time when the terminal is capable of using at least two resource allocation modes simultaneously.

10. The method according to claim 9, wherein the determining resource allocation mode configuration information of a sidelink interface of a terminal comprises:
  obtaining preset information of a sidelink reported by the terminal;
  determining the resource allocation mode configuration information of the sidelink interface of the terminal according to the preset information of the sidelink;
  wherein the preset information includes at least one of the following:
    a frequency band or a set of frequency band allowed by the sidelink interface of the terminal;
    a wireless access technology allowed by the terminal on the sidelink interface;
    a frequency band or a set of frequency band and a radio access technology corresponding to the frequency band or the set of frequency band allowed by the terminal on the sidelink interface;
    a logical channel identifier corresponding to each logical channel of the sidelink interface of the terminal;
    all QoS parameters or QoS parameters corresponding to a current logical channel or QoS parameters corresponding to a logical channel that currently has data to be sent allowed by the sidelink interface of the terminal; QoS parameters corresponding to each logical channel of the sidelink interface of the terminal.

11. The method according to claim 10, wherein the determining the resource allocation mode configuration information of the sidelink interface of the terminal according to the preset information of the sidelink comprises:
  determining a resource allocation mode allowed by the terminal on the sidelink interface according to the preset information of the sidelink;
  determining the resource allocation mode configuration information of the terminal according to the resource allocation mode allowed by the terminal on the sidelink interface.

12. The method according to claim 11, wherein the determining the resource allocation mode allowed by the terminal on the sidelink interface according to the preset information of the sidelink includes at least one of the following methods:
  determining a resource allocation allowed by the terminal on the sidelink interface based on the terminal;
  determining a resource allocation mode allowed by the terminal based on each frequency band or a set of frequency band of the sidelink interface of the terminal;
  determining a resource allocation mode allowed by the terminal based on each wireless access technology allowed by the terminal on the sidelink interface;
  determining a resource allocation mode allowed by the terminal based on each set of QoS parameters of the sidelink interface;
  separately determining a resource allocation mode allowed by each logical channel of the terminal on the sidelink interface based on each logical channel of the sidelink interface of the terminal;
  for each frequency band or the set of frequency band, determining the resource allocation mode allowed by the terminal based on each logical channel of the sidelink interface of the terminal;
  for each wireless access technology, determining the resource allocation mode allowed by the terminal based on each logical channel of the sidelink interface of the terminal.

13. The method according to claim 12, wherein after separately determining the resource allocation mode allowed by each logical channel of the terminal on the sidelink interface based on each logical channel of the sidelink interface of the terminal, the method further comprises:

configuring a resource allocation mode corresponding to the frequency band or the set of frequency band or the radio access technology for each logical channel.

14. The method according to claim 9, further comprising:
configuring a priority of the resource allocation mode and sending the priority to the terminal.

15. The method according to claim 14, wherein configuring a priority of the resource allocation mode comprises:
configuring the priority of the resource allocation mode based on the terminal; or
separately configuring the priority of the resource allocation mode based on each frequency band or the set of frequency band of the sidelink interface; or
separately configuring the priority of the resource allocation mode based on each logical channel of the sidelink interface; or
separately configuring the priority of the resource allocation mode based on each set of QoS parameters of the sidelink interface.

16. The method according to claim 15, wherein after separately configuring the priority of the resource allocation mode based on each logical channel of the sidelink interface, the method further comprises:
configuring a priority of a resource allocation mode allowed by each frequency band or the set of frequency band of each logical channel or the wireless access technology.

17. A terminal, comprising: a transceiver, a memory, a processor, and a program stored in the memory and executed by the processor, wherein the processor executes the program to implements the following steps:
obtaining resource allocation mode configuration information of a sidelink interface of a terminal;
in a case that the resource allocation mode configuration information includes at least two resource allocation modes,
selecting, from the at least two resource allocation modes, a resource allocation mode with a highest priority as a resource allocation mode allowed by the terminal on a preset frequency band at a preset time,
wherein the preset time is any time when the terminal is capable of using at least two resource allocation modes simultaneously.

18. The terminal according to claim 17, wherein the resource allocation mode configuration information includes at least one of the following:
a resource allocation mode allowed by the terminal on the sidelink interface;
a resource allocation mode allowed by the terminal in each frequency band or a set of frequency band of the sidelink interface;
a resource allocation mode allowed by the terminal for each wireless access technology allowed by the sidelink interface;
a resource allocation mode allowed by the terminal for each set of quality of service (QoS) parameters on the sidelink interface;
a resource allocation mode allowed by the terminal for each logical channel on the sidelink interface;
for each frequency band or the set of frequency band, a resource allocation mode allowed by each logical channel of the sidelink interface of the terminal in the frequency band or the set of frequency band;
for each wireless access technology, a resource allocation mode allowed by each logical channel of the sidelink interface of the terminal when using the wireless access technology.

19. The terminal according to claim 17, wherein the processor further executes the program to implement the following step:
determining a resource allocation mode allowed by the terminal on the preset frequency band at the preset time according to priorities of the at least two resource allocation modes agreed in a protocol,
the at least two resource allocation modes include: a resource allocation mode scheduled by the network and a resource allocation mode selected by the terminal;
the protocol defines a priority of the resource allocation mode scheduled by the network is higher than a priority of the resource allocation mode selected by the terminal; or
the protocol defines that the priority of the resource allocation mode selected by the terminal is higher than the priority of the resource allocation mode scheduled by the network.

20. A network device, comprising: a transceiver, a memory, a processor, and a program stored on the memory and executed by the processor, wherein the processor executes the program to implement the following steps:
determining resource allocation mode configuration information of a sidelink interface of a terminal, wherein the resource allocation mode configuration information includes at least two resource allocation modes;
sending the resource allocation mode configuration information to the terminal through the transceiver, wherein the resource allocation mode configuration information enables the terminal to select, from the at least two resource allocation modes, a resource allocation mode with a highest priority as a resource allocation mode allowed by the terminal on a preset frequency band at a preset time,
wherein the preset time is any time when the terminal is capable of using at least two resource allocation modes simultaneously.

* * * * *